United States Patent [19]

Suzuki et al.

[11] Patent Number: 4,599,157
[45] Date of Patent: Jul. 8, 1986

[54] OXYGEN PERMEABLE MEMBRANE

[75] Inventors: Nobukazu Suzuki, Tokyo; Shinji Tsuruta, Yokohama, both of Japan

[73] Assignee: Kabushiki Kaisha Toshiba, Kanagawa, Japan

[21] Appl. No.: 705,015

[22] Filed: Feb. 25, 1985

[30] Foreign Application Priority Data

Feb. 24, 1984 [JP] Japan .................................. 59-33589
Feb. 24, 1984 [JP] Japan .................................. 59-33593

[51] Int. Cl.⁴ ............................................ C23C 14/00
[52] U.S. Cl. ............................ 204/192 SP; 204/192 C; 204/282; 204/283; 204/295; 204/296; 204/432
[58] Field of Search .......... 204/192 C, 192 SP, 192 P, 204/295-296, 432, 282, 283

[56] References Cited

U.S. PATENT DOCUMENTS 4,272,353  6/1981  Lawrance et al. ................. 204/283
4,326,927  4/1982  Stetter et al. ...................... 204/432
4,400,242  8/1983  Albery et al. ....................... 204/415
4,419,202 12/1983  Gibson ............................. 204/192 C
4,421,579 12/1983  Covitch et al. .................... 204/283

OTHER PUBLICATIONS

"Thin Film Processes" by J. L. Vossen et al., Academic Press, 1978, p. 48.

Primary Examiner—R. L. Andrews
Attorney, Agent, or Firm—Banner, Birch, McKie & Beckett

[57] ABSTRACT

There is disclosed a composite membrane and an air electrode for use in hydrogen-oxygen fuel cells, metal-air cells and oxygen sensors. The composite membrane includes a porous membrane having micropores with a thin layer affixed thereto. The thin layer having metallic oxide in a carbon matrix, so that oxygen gas is able to permeate therethrough, but water vapor in air is not allowed to permeate therethrough.

10 Claims, 1 Drawing Figure

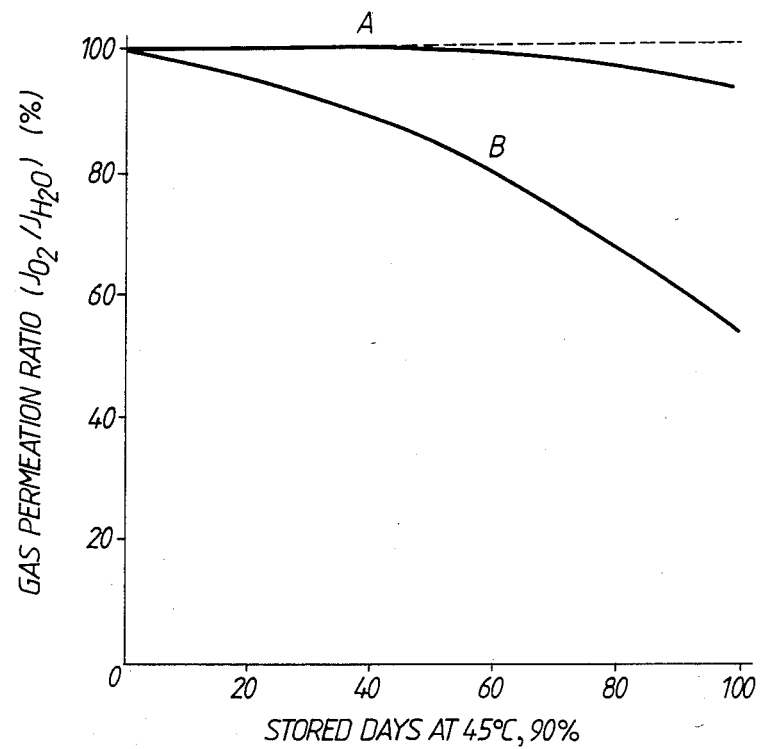

OXYGEN PERMEABLE MEMBRANE

BACKGROUND OF THE INVENTION

This invention relates to an oxygen permeable membrane which permits oxygen gas to pass through while substantially blocking water vapor. The present invention has application in hydrogen-oxygen electric fuel cells, metal-air battery cells and oxygen sensing devices.

In the prior art, gas diffusion electrodes have been used for air electrodes in various fuel cells, air-metal cells, such as air-zinc cells, and Galvanic oxygen sensors. Thick porous electrodes having distributed pores with a uniform diameter were used as the gas diffusion electrode. In recent years, however, electrodes having a two-layer structure have been used. The electrode comprised a porous electrode body with an electrochemical reduction function for oxygen gas (a function for ionizing oxygen) and a current collector function. The electrode also had a thin water repellent layer deposited integrally on the gas-side surface of the electrode body.

In such electrodes, the electrode body may be formed by a conductive powder, a porous metallic body, a porous carbon body or a non-woven carbon fabric material. This may be accomplished by use of a binder such as polytetrafluoroethylene. Such conductive powders may be selected from among active carbon powders carrying a nickel tungstate with a low reduction overvoltage to oxygen gas, a tungsten carbide coated with palladium, cobalt, nickel, silver, platinum or palladium.

The aforementioned water repellent layer, which is deposited integrally on the gas-side surface of the electrode body, is a porous thin membrane which comprises a fluorine containing a resin such as polytetrafluoroethylene, tetrafluoroethylene-hexafluoropropylene copolymer or ethylene-tetrafluoroethylene copolymer. The membrane may also be comprised of a resin, such as polypropylene, in the form of a porous material including, for example, a sintered powder material having a particle size of from 0.2 to 40 $\mu$m; a paper-like non-woven fabric material prepared by heat treatment of fibers comprising polypropylene resin or by a similar woven fabric material; a powder material wherein the polypropylene resin is partially replaced by a fluorinated graphite; a film material prepared by rolling fine powder together with a pore-increasing agent or a lubricant oil followed by heat treatment or a film material prepared by rolling without being followed by heat treatment. Such materials are disclosed in Japanese Patent Publication No. 44978/1973.

In an air electrode having the structure as described above, however, the water repellent layer deposited on the gas-side surface of the electrode body is impervious to electrolyte but is not impervious to air and water vapor in the air. For this reason, water vapor in the air may penetrate the electrode body through the water repellent layer and dilute the electrolyte or the water in the electrode may otherwise dissipate through the water repellent layer, thereby increasing electrolyte concentration. As a result, the concentration of the electrolyte will fluctuate and it will thus be impossible to maintain a stable discharge characteristics over a long period of time.

When carbon dioxide gas in the air penetrates the electrode body through the water repellent layer and is absorbed by an active site (a porous portion of the electrode body), the electrochemical reducing function of the active site to oxygen gas is reduced at the point of absorption. Thus, the heavy-load discharge capability of the cell is adversely effected. Moreover, when an alkaline electrolyte is used, there will be a change in the properties of the electrolyte, a reduction in the concentration of the electrolyte and, if the cathode is zinc, passivation of the zinc cathode. Furthermore, heavy-load discharge may be hindered because the area of electrochemical reduction is reduced by the production of carbonate in the active site which blocks the pores. These factors lead to a decline in the performance of the cell from its design rating after the cell is stored or used for a long period of time.

In order to overcome the aforementioned disadvantages, there has been proposed a cell in which a water repellent layer for the air electrode is provided on the gas side (air side) thereof with a layer comprising a water-absorbing agent, such as calcium chloride, or a carbon dioxide gas-absorbing agent, such as a hydroxide of an alkaline earth metal. Such a cell is disclosed in Japanese Patent Publication No. 8411/1973. This type of cell can prevent the above-mentioned problems to some extent. However, when the absorbing agent has been saturated with water or carbon dioxide gas, it becomes wholly ineffective.

There have also been attempts to laminate an oxygen permeable membrane on the abovementioned water repellent layer. Such a membrane is disclosed in Japanese Patent Publication No. 26896/1973. However, a sufficiently effective oxygen gas permeable membrane has not been developed thus far.

SUMMARY OF THE INVENTION

It is therefore an object of the present invention to provide a selectively permeable composite membrane, and an air electrode being made therefrom, which is permeable to oxygen gas while at the same time being impervious to water vapor in air.

It is another object of the invention to provide an air electrode comprising an oxygen gas permeable membrane which enables a heavy-load discharge to be maintained over a long period of time.

According to a first aspect of this invention, a selectively permeable composite membrane having a two-layer construction is provided. The membrane comprises a porous membrane layer having micropores and a thin layer containing, in a carbon matrix, a water-containable or wettable metallic oxide, a metal oxide having the capability of absorbing oxygen, or a metal oxide having a rutile-type crystal structure. The thin layer is laminated integrally on to one or both surfaces of the porous membrane layer.

According to a second aspect of this invention, an air electrode is provided which comprises a main body having the capability of electrochemical reduction of oxygen gas with a collector function and a thin layer containing metallic oxide in a carbon matrix. The thin layer is laminated integrally on to the gas side surface of the main body of the electrode either directly or with a porous membrane layer between. In this embodiment of the invention the metallic oxide may be a water-containable or wettable metallic oxide or have the capability of absorbing oxygen or have a rutile-type crystal structure. The water-containable or wettable metallic oxide used in this invention is a material having the ability to absorb water and having properties for permitting the water absorbed to exist as chemically and physically absorbed water. The water-containable (wettable) properties means that a metallic oxide exists in combination with water molecules or in a state having an interaction with water molecules. Examples of the above mentioned metallic oxides include tin dioxide ($SnO_2$), zinc oxide (ZnO), aluminum oxide ($Al_2O_3$), magnesium oxide (MgO), calcium oxide (CaO), strontium oxide (SrO), barium oxide (BaO), titanium dioxide ($TiO_2$) and silicon dioxide ($SiO_2$). These oxides may be used alone or in the form of a composite comprising a combination of two or more types thereof.

The above described metal oxides having the capability of absorbing oxygen refers to those oxides which have the property of absorbing oxygen in the form of molecules ($O_2$) or ions ($O_2^-$, $O^-$, $O^{2-}$). Such metal oxides include tin dioxide ($SnO_2$), zinc oxide (ZnO), cuprous oxide ($Cu_2O$), manganese monoxide (MnO), nickel oxide (NiO), and tricobalt tetroxide ($Co_3O_4$). These oxides may be used alone or in the form of a composite comprising a combination of two or more types thereof. Among these oxides, $SnO_2$, ZnO are particularly useful.

The above described metal oxides with a rutile-type crystal structure refers to those oxides having a structure indicated by the chemical formula $AO_2$ in which the coordination polyhedrons are regular octahedrons, these octahedrons being aggregated unidimensionally in a row by having their edges commonly joined. Such oxides include tin dioxide ($SnO_2$), titanium dioxide ($TiO_2$), vanadium dioxide ($VO_2$), molybdenum dioxide ($MoO_2$), tungsten dioxide ($WO_2$), ruthenium dioxide ($RuO_2$), niobium dioxide ($NbO_2$), chromium dioxide ($CrO_2$), rhenium dioxide ($-ReO_2$), osmium dioxide ($OsO_2$), rhodium dioxide ($RhO_2$), iridium dioxide ($IrO_2$), and platinum dioxide ($PtO_2$). These oxides may also be used alone or in the form of a composite comprising a combination of two or more types. Among these oxides, $SnO_2$ and $TiO_2$ are particularly useful.

BRIEF DESCRIPTION OF THE DRAWING

FIG. 1 is a graph showing the gas permeation ratio versus time of a composite membrane according to the present invention where the test sample is maintained at 45° C. and 90% relative humidity.

DETAILED DESCRIPTION OF THE PREFERRED EMBODIMENT

The composite membrane of the present invention is manufactured as follows. A thin layer contained in a carbon matrix, a water-containable or wettable metal oxide, or a metal oxide having the capability of absorbing oxygen, or metal oxide of a rutile-type crystal structure is affixed or deposited directly to one or both surfaces of a porous membrane. An appropriate method of affixing the thin layer to the porous membrane is by reactive sputtering. Reactive sputtering is a well known method of forming thin membranes. In the reactive sputtering method, the above mentioned metallic oxides are used as sputter sources. The gas used in the sputtering process is argon gas containing alkanes of the general formula $C_nH_{2n+2}$, such as $CH_4$, $C_2H_6$ or $C_3H_8$, alkenes of the general formula $C_nH_{2n}$, such as $C_2H_4$, $C_3H_6$ or $C_4H_8$, or alkynes of the general formula $C_nH_{2n-2}$, such as $C_2H_2$. Argon gas containing various fluorinated hydrocarbons in which a part or all of the hydrogen of the hydrocarbon compound has been substituted by fluorine may also be used. Argon gas containing two or more of the above-mentioned substances can also be used. It is preferred that the proportion of such hydrocarbon compound is less than 20 vol % so as not to make a thin layer consisting of only hydrocarbon.

Provided the porous membrane mentioned above has micropores of a diameter of 1.0 um or less, any material would serve the purpose. However, from the viewpoint of affixing the membrane to the main body of the electrode, a material that is highly flexible is preferred. If the diameter of the pores is in excess of 1.0 um, pinholes will appear in large numbers in the thin layer containing the metal oxide in a carbon matrix when the layer is formed on the porous membrane. This results not only in the penetration of water vapor and carbonic acid, but also a reduction in mechanical strength, with the consequent risk of breakage. Further, the porous membrane should have the micropores described above distributed over it uniformly. It is appropriate for the volume of the cavities of the micropores to be from 0.1% to 90% of the total volume of the film.

Examples of this type of porous membrane include porous fluororesin membrane (trade name, Fluoropore; manufactured by Sumitomo Electric Industries, Ltd.); porous polycarbonate membrane (trade name, Nuclepore; manufactured by the Nuclepore Corporation); porous cellulose ester membrane (trade name, Millipore Membrane Filter; manufactured by the Millipore Corporation); and porous polypropylene membrane (trade name, Celguard; manufactured by Celanese Plastics Co., Ltd.).

The thickness of the thin layer mentioned above is preferably 0.01–1.0 um. The reason for this is that if it is less than 0.01 um, numerous pinholes appear in the thin layer when it has been formed which reduces its effectiveness in preventing the penetration of water vapor or carbon dioxide. At the same time, the mechanical strength of the thin layer is reduced so that it becomes susceptible to breakage. If on the other hand, the thickness of the thin layer exceeds 1.0 um, the heavy-load discharge properties of the electrode are impaired because the amount of oxygen gas which penetrates the membrane is reduced.

The present invention will be described in detail in accordance with the following Examples.

EXAMPLES 1 TO 9

Each composite membrane was made by forming a thin layer of 0.4 um in thickness containing various water-containing or wettable metal oxides in a carbon matrix on one surface of a porous polycarbonate membrane with micropores of a mean pore diameter of 0.08 um distributed uniformly over its surfaces and with a pore volume of 3% (trade name, Nuclepore; Nuclepore Corporation, thickness 5 um). The thin layer was formed by a reactive sputtering treatment with $SnO_2$, ZnO, $Al_2O_3$, MgO, CaO, SrO, BaO, $TiO_2$ and $SiO_2$ as the sputter sources and using a mixture of argon and methane gas (Ar; 90 vol%, $CH_4$; 10 vol%) at a pressure of $2 \times 10^{-3}$ Torr with a high frequency (13.56 MHz) electric power source of 100 W.

EXAMPLES 10 TO 15

A composite membrane was made by forming a thin layer of 0.4 um thickness containing, in a carbon matrix, various metal oxides having the capability of absorbing oxygen on one surface of a porous membrane of the same composition as that used in Examples 1–9 with $SnO_2$, ZnO, $Cu_2O$, MnO, NiO and $Co_3O_4$ as the sputter sources and under the same conditions as set forth for Examples 1-9.

EXAMPLES 16-28

A composite membrane was made by forming a thin layer of 0.4 um thickness containing, in a carbon matrix, various metal oxides having a rutile-type crystal structure on a porous membrane of the same composition as that used in Examples 1-9 with $SnO_2$, $TiO_2$, $VO_2$, $MoO_2$, $WO_2$, $RuO_2$, $NbO_2$, $CrO_2$, $\alpha$-$ReO_2$, $OsO_2$, $RhO_2$, $IrO_2$ and $PtO_2$ as the sputter sources under the same conditions as set forth for Examples 1-9.

COMPARATIVE EXAMPLES 1-9

A composite membrane was made by forming a thin layer of 0.4 um thickness consisting of various water-containable or wettable metal oxides on one surface of a porous polycarbonate membrane with micropores of a mean pore diameter of 0.03 um distributed uniformly over its surface and with a pore volume of 0.42% (trade name, Nuclepore; Nuclepore Corporation, thickness 5 um) by a reactive sputtering treatment with $SnO_2$, ZnO, $Al_2O_3$, MgO, CaO, SrO, BaO, $TiO_2$ and $SiO_2$ as the sputter sources and using argon gas at a pressure of $2 \times 10^{-3}$ Torr and with a high frequency electric power source of 100 W.

COMPARATIVE EXAMPLES 10-15

A composite membrane was made by forming a thin layer of 0.4 um thickness consisting of various metal oxides having the capability of absorbing oxygen on one surface of a porous membrane of the same composition as that used in Comparative Examples 1-9 with $SnO_2$, ZnO, $Cu_2O$, MnO, NiO and $Co_3O_4$ as the sputter sources and under the same conditions as set forth for Comparative Examples 1-9.

COMPARATIVE EXAMPLES 16-28

A composite membrane was made by forming a thin layer of 0.4 um thickness consisting of various metal oxides having a rutile-type crystal structure on one surface of a porous membrane of the same composition as that used in Comparative Examples 1-9 with $SnO_2$, $TiO_2$, $VO_2$, $MoO_2$, $WO_2$, $RuO_2$, $NbO_2$, $CrO_2$, $\alpha$-$ReO_2$, $OsO_2$, $RhO_2$, $IrO_2$ and $PtO_2$ as the sputter sources under the same conditions as set forth for Comparative Examples 1-9.

The rate of permeation of oxygen gas ($JO_2$: $cc/sec.cm^2.cmHg$) was measured in each of the above Examples 1-28 and Comparative Examples 1-28 by the equilibrium pressure method in which a gas chromatograph is used for detection of the gas. The rate of permeation of water vapor ($JH_2O$: $cc/sec.cm^2.cmHg$) was measured in accordance with the JIS SZ0208 measuring standard (cup method), and the ratio of the two ($JO_2/JH_2O$) was calculated as the gas permeation ratio. The results are given in Tables 1-3. Table 3 lists the results of measurements of $JO_2$ and $JH_2O$, and of the subsequent calculation of the $JO_2/JH_2O$ ratio with respect to a polysiloxane membrane of thickness 50 um (Comparative Example 29), a medium-density polyethylene membrane of thickness 20 um (Comparative Example 30), a biaxially-oriented polypropylene membrane of thickness 20 um (Comparative Example 31), a polytetrafluoroethylene membrane of thickness 20 um (Comparative Example 32), a commercial FEP membrane of thickness 20 um (Comparative Example 33), and a FEP thin layer of 0.4 um thickness made by forming a membrane on a porous polycarbonate membrane of the same specifications as that used in the Comparative Examples by the sputtering method (Comparative Example 34).

TABLE 1

| Example | Thin Layer Metal Oxide | Thickness of Composite Membrane (um) | $JO_2$ (cc/sec · cm² · cmHg) | $JH_2O$ (cc/sec · cm² · cmHg) | $JO_2/JH_2O$ |
|---|---|---|---|---|---|
| 1 | $SnO_2$ | 5.4 | $1.7 \times 10^{-4}$ | $1.6 \times 10^{-5}$ | 10.6 |
| 2 | ZnO | 5.4 | $1.9 \times 10^{-4}$ | $2.1 \times 10^{-5}$ | 9.0 |
| 3 | $Al_2O_3$ | 5.4 | $1.8 \times 10^{-4}$ | $1.9 \times 10^{-5}$ | 9.5 |
| 4 | MgO | 5.4 | $2.0 \times 10^{-4}$ | $2.4 \times 10^{-5}$ | 8.3 |
| 5 | CaO | 5.4 | $1.9 \times 10^{-4}$ | $2.1 \times 10^{-5}$ | 9.0 |
| 6 | SrO | 5.4 | $2.1 \times 10^{-4}$ | $2.5 \times 10^{-5}$ | 8.4 |
| 7 | BaO | 5.4 | $2.0 \times 10^{-4}$ | $2.4 \times 10^{-5}$ | 8.3 |
| 8 | $TiO_2$ | 5.4 | $2.3 \times 10^{-4}$ | $2.5 \times 10^{-5}$ | 9.2 |
| 9 | $SiO_2$ | 5.4 | $2.0 \times 10^{-4}$ | $2.1 \times 10^{-5}$ | 9.5 |
| 10 | $SnO_2$ | 5.4 | $1.7 \times 10^{-4}$ | $1.6 \times 10^{-5}$ | 10.6 |
| 11 | ZnO | 5.4 | $1.9 \times 10^{-4}$ | $2.1 \times 10^{-5}$ | 9.0 |
| 12 | $Cu_2O$ | 5.4 | $2.4 \times 10^{-4}$ | $3.6 \times 10^{-5}$ | 6.7 |
| 13 | MnO | 5.4 | $2.3 \times 10^{-4}$ | $3.5 \times 10^{-5}$ | 6.6 |
| 14 | NiO | 5.4 | $2.5 \times 10^{-4}$ | $3.6 \times 10^{-5}$ | 6.9 |
| 15 | $Co_3O_4$ | 5.4 | $2.4 \times 10^{-4}$ | $3.5 \times 10^{-5}$ | 6.9 |
| 16 | $SnO_2$ | 5.4 | $1.7 \times 10^{-4}$ | $1.6 \times 10^{-5}$ | 10.6 |
| 17 | $TiO_2$ | 5.4 | $2.3 \times 10^{-4}$ | $2.5 \times 10^{-5}$ | 9.2 |
| 18 | $VO_2$ | 5.4 | $2.5 \times 10^{-4}$ | $5.6 \times 10^{-5}$ | 4.5 |
| 19 | $MoO_2$ | 5.4 | $2.5 \times 10^{-4}$ | $5.7 \times 10^{-5}$ | 4.4 |
| 20 | $WO_2$ | 5.4 | $2.5 \times 10^{-4}$ | $5.7 \times 10^{-5}$ | 4.4 |
| 21 | $RuO_2$ | 5.4 | $2.4 \times 10^{-4}$ | $5.6 \times 10^{-5}$ | 4.3 |
| 22 | $NbO_2$ | 5.4 | $2.5 \times 10^{-4}$ | $5.6 \times 10^{-5}$ | 4.5 |
| 23 | $CrO_2$ | 5.4 | $2.5 \times 10^{-4}$ | $5.7 \times 10^{-5}$ | 4.4 |
| 24 | $\alpha$-$ReO_2$ | 5.4 | $2.4 \times 10^{-4}$ | $5.5 \times 10^{-5}$ | 4.4 |
| 25 | $OsO_2$ | 5.4 | $2.5 \times 10^{-4}$ | $5.7 \times 10^{-5}$ | 4.4 |
| 26 | $RhO_2$ | 5.4 | $2.4 \times 10^{-4}$ | $5.5 \times 10^{-5}$ | 4.4 |
| 27 | $IrO_2$ | 5.4 | $2.6 \times 10^{-4}$ | $5.8 \times 10^{-5}$ | 4.5 |
| 28 | $PtO_2$ | 5.4 | $2.7 \times 10^{-4}$ | $6.0 \times 10^{-5}$ | 4.5 |

TABLE 2

| Comparative Example | Thin Layer Metal Oxide | Thickness of Composite Membrane (um) | $JO_2$ (cc/sec · cm² · cmHg) | $JH_2O$ (cc/sec · cm² · cmHg) | $JO_2/JH_2O$ |
| --- | --- | --- | --- | --- | --- |
| 1 | $SnO_2$ | 5.4 | $1.7 \times 10^{-5}$ | $8.5 \times 10^{-6}$ | 2.0 |
| 2 | $ZnO$ | 5.4 | $2.0 \times 10^{-5}$ | $1.2 \times 10^{-5}$ | 1.7 |
| 3 | $Al_2O_3$ | 5.4 | $1.9 \times 10^{-5}$ | $1.0 \times 10^{-5}$ | 1.9 |
| 4 | $MgO$ | 5.4 | $2.1 \times 10^{-5}$ | $1.3 \times 10^{-5}$ | 1.6 |
| 5 | $CaO$ | 5.4 | $2.0 \times 10^{-5}$ | $1.2 \times 10^{-5}$ | 1.7 |
| 6 | $SrO$ | 5.4 | $2.2 \times 10^{-5}$ | $1.4 \times 10^{-5}$ | 1.6 |
| 7 | $BaO$ | 5.4 | $2.1 \times 10^{-5}$ | $1.3 \times 10^{-5}$ | 1.6 |
| 8 | $TiO_2$ | 5.4 | $2.3 \times 10^{-5}$ | $1.3 \times 10^{-5}$ | 1.8 |
| 9 | $SiO_2$ | 5.4 | $2.1 \times 10^{-5}$ | $1.1 \times 10^{-5}$ | 1.9 |
| 10 | $SnO_2$ | 5.4 | $1.7 \times 10^{-5}$ | $8.5 \times 10^{-6}$ | 2.0 |
| 11 | $ZnO$ | 5.4 | $2.0 \times 10^{-5}$ | $1.2 \times 10^{-5}$ | 1.7 |
| 12 | $Cu_2O$ | 5.4 | $6.3 \times 10^{-5}$ | $4.5 \times 10^{-5}$ | 1.4 |
| 13 | $MnO$ | 5.4 | $6.4 \times 10^{-5}$ | $4.6 \times 10^{-5}$ | 1.4 |
| 14 | $NiO$ | 5.4 | $7.7 \times 10^{-5}$ | $5.1 \times 10^{-5}$ | 1.5 |
| 15 | $Co_3O_4$ | 5.4 | $8.0 \times 10^{-5}$ | $5.3 \times 10^{-5}$ | 1.5 |

TABLE 3

| Comparative Example | Thin Layer Metal Oxide | Thickness of Composite Membrane (um) | $JO_2$ (cc/sec · cm² · cmHg) | $JH_2O$ (cc/sec · cm² · cmHg) | $JO_2/JH_2O$ |
| --- | --- | --- | --- | --- | --- |
| 16 | $SnO_2$ | 5.4 | $1.7 \times 10^{-5}$ | $8.5 \times 10^{-6}$ | 2.0 |
| 17 | $TiO_2$ | 5.4 | $2.3 \times 10^{-5}$ | $1.3 \times 10^{-5}$ | 1.8 |
| 18 | $VO_2$ | 5.4 | $1.0 \times 10^{-4}$ | $8.5 \times 10^{-5}$ | 1.2 |
| 19 | $MoO_2$ | 5.4 | $9.7 \times 10^{-5}$ | $8.8 \times 10^{-5}$ | 1.1 |
| 20 | $WO_2$ | 5.4 | $9.6 \times 10^{-5}$ | $8.7 \times 10^{-5}$ | 1.1 |
| 21 | $RuO_2$ | 5.4 | $9.0 \times 10^{-5}$ | $9.0 \times 10^{-5}$ | 1.0 |
| 22 | $NbO_2$ | 5.4 | $1.0 \times 10^{-4}$ | $8.5 \times 10^{-5}$ | 1.2 |
| 23 | $CrO_2$ | 5.4 | $9.7 \times 10^{-5}$ | $8.8 \times 10^{-5}$ | 1.1 |
| 24 | $\alpha$-$ReO_2$ | 5.4 | $9.1 \times 10^{-5}$ | $9.1 \times 10^{-5}$ | 1.0 |
| 25 | $OsO_2$ | 5.4 | $9.6 \times 10^{-5}$ | $8.7 \times 10^{-5}$ | 1.1 |
| 26 | $RhO_2$ | 5.4 | $9.6 \times 10^{-5}$ | $8.5 \times 10^{-5}$ | 1.1 |
| 27 | $IrO_2$ | 5.4 | $9.9 \times 10^{-5}$ | $9.0 \times 10^{-5}$ | 1.2 |
| 28 | $PtO_2$ | 5.4 | $1.0 \times 10^{-4}$ | $8.5 \times 10^{-5}$ | 1.2 |
| 29 | polysiloxane film (50 um) | | $1.2 \times 10^{-5}$ | $3.7 \times 10^{-4}$ | $3.2 \times 10^{-2}$ |
| 30 | polyethylene film (20 um) | | $1.6 \times 10^{-7}$ | $4.7 \times 10^{-6}$ | $3.4 \times 10^{-2}$ |
| 31 | polypropylene film (20 um) | | $3.6 \times 10^{-8}$ | $2.4 \times 10^{-6}$ | $1.6 \times 10^{-2}$ |
| 32 | polytetrafluoroethylene film (20 um) | | $2.1 \times 10^{-7}$ | $4.1 \times 10^{-6}$ | $5.1 \times 10^{-2}$ |
| 33 | commercial FEP film (20 um) | | $2.5 \times 10^{-7}$ | $2.7 \times 10^{-6}$ | $9.2 \times 10^{-2}$ |
| 34 | FEP sputtered film (0.4 um) | | $7.2 \times 10^{-5}$ | $6.5 \times 10^{-4}$ | 0.11 |

For the composite membranes of the above Example 1 and Comparative Example 1, the variation with respect to time was determined for the gas permeation ratio $JO_2/JH_2O$ at a temperature of 45° C. at 90% relative humidity. FIG. 1 shows this characteristic plotted as a graph. Relative values are shown, taking the initial value of the gas permeation ratio as 100%. In FIG. 1, A is the characteristic curve of Example 1, and B is the characteristic curve of Comparative Example 1.

As explained above, even though the composite membrane of this invention is extremely thin, it does not allow permeation of water vapor in the air but has a high selective permeability for oxygen gas. It also has excellent durability so that when it is combined with the main electrode body, it enables the realization of an air electrode that is capable of heavy-load discharge over a long period of time and shows a marked improvement in retention of these properties and is resistant to leakage.

The air electrode of this invention is made by affixing the thin layer containing the metal oxides described above in a carbon matrix to the surface on the gas side of the main body of the electrode, either directly, or with a porous membrane in between. The first method is to form the thin layer containing the metal oxides described above in a carbon matrix directly on the surface of the gas side of the main body of the electrode by reactive sputtering. The second method is to make a composite membrane by forming the thin layer containing the metal oxides in a carbon matrix on one side of a flexible porous membrane having micropores of a diameter of 1.0 um or less by the reactive sputtering method and then to bond the other side of this composite membrane (i.e., the other side of the porous membrane) at a prescribed pressure on to the surface of the gas side of the main body of the electrode.

The air electrode prepared by the above method may be incorporated into a cell in a manner known in the art. In this case, in order to permit a supply of momentary large current by the electrochemical reduction of an electrodeconstituting element itself in addition to the electrochemical reduction of oxygen gas, it is preferable to deposit integrally, on the electrolyte side of the electrode body, a porous layer containing at least one of a metal, an oxide or a hydroxide in which the oxidation state can vary by a more ignoble potential in the range of 0.4 V than the oxidation-reduction balanced potential of oxygen. This porous layer can be oxidized with oxygen gas by a local cell action during discharge at a light-load or at the time of open-circuit to return to the original oxidation state. Examples of materials constituting such a porous layer include $Ag_2O$, $MnO_2$, $Co_2O_3$, $PbO_2$, a variety of perovskite type oxides and spinel type oxides.

EXAMPLES 29-37

Raney nickel plate (thickness 200 um) of 80% porosity and with a mean pore diameter of 5 um was used for the main body of the electrode. On one surface of the plate, a thin layer (thickness 0.4 um) containing water-containable or wettable metal oxide in a carbon matrix was formed by reactive sputtering with $SnO_2$, $ZnO$, $Al_2O_3$, $MgO$, $CaO$, $SrO$, $BaO$, $TiO_2$ and $SiO_2$ as the sputter sources and with a gas mixture of argon and methane (Ar, 90 vol%, $CH_4$, 10 vol%) at a pressure of $2\times10^{-3}$ Torr and with a high frequency electric power source.

The Raney nickel plate with the above thin layer was then dipped in 0.2% solution of palladium chloride. Palladium was deposited to a thickness of 0.5 um over the entire surface of the air electrode by cathode polarization, including those parts of the surface containing the pores in the Raney nickel plate.

EXAMPLES 38-46

A composite membrane was prepared by forming, on one surface of a porous polycarbonate membrane with uniformly distributed micropores of a mean diameter of 0.08 um and a pore volume of 3.0% (manufactured by the Nuclepore Corporation); trade name, Nuclepore; thickness 5 um), a thin layer of 0.4 um thickness containing water-containable or wettable metal oxides in a carbon matrix by reactive sputtering with $SnO_2$, $ZnO$, $Al_2O_3$, $MgO$, $CaO$, $SrO$, $BaO$, $TiO_2$ and $SiO_2$ as the sputter sources and with a gas mixture of argon and methane (Ar, 90 vol%; $CH_4$, 10 vol%) at a pressure of $2\times10^{-3}$ Torr with a high frequency electric power source of 100 W. After bonding the composite membrane to one surface of a Raney nickel plate (thickness 200 um) of 80% porosity and with a mean pore diameter of 5 um, the Raney nickel plate with the above thin layer was then dipped in 0.2% solution of palladium chloride. Palladium was deposited to a thickness of 0.5 um over the entire surface of the air electrode by cathode polarization, including those parts of the surface containing the pores in the Raney nickel plate.

EXAMPLES 47-52

A thin layer of 0.4 um thickness containing, in a carbon matrix, metal oxides capable of absorbing oxygen was formed on one surface of the main body of an electrode similar to that employed in Examples 29-37 with $SnO_2$, $ZnO$, $Cu_2O$, $MnO$, $NiO$ and $Co_3O_4$ as the sputter sources and under the same conditions as set forth above in Examples 1-9. The air electrodes were then manufactured by the same method as used for Examples 29-37.

EXAMPLES 53-58

A thin layer of 0.4 um thickness containing, in a carbon matrix, metal oxides capable of absorbing oxygen was formed on one surface of a porous membrane of the same composition as that employed in Examples 38-46 with $SnO_2$, $ZnO$, $Cu_2O$, $MnO$, $NiO$ and $Co_3O_4$ as the sputter sources, and under the same conditions as set forth above in Examples 38-46. The air electrodes were then manufactured by the same method as used for Examples 38-46.

EXAMPLES 59-71

A thin layer of 0.4 um thickness containing, in a carbon matrix, metal oxides of a rutile-type crystal structure was formed on one surface of the main body of an electrode of the same composition as that employed in Examples 29-37 with $SnO_2$, $TiO_2$, $VO_2$, $MoO_2$, $WO_2$, $RuO_2$, $NbO_2$, $CrO_2$, $\alpha$—$ReO_2$, $OsO_2$, $RhO_2$, $IrO_2$ and $PtO_2$ as the sputter sources under the same conditions as set forth above in Examples 29-37. The air electrodes were manufactured by the method used for Examples 29-37.

EXAMPLES 72-84

A thin layer of 0.4 um thickness containing, in a carbon matrix, metal oxides of a rutile-type crystal structure was formed on one surface of a porous membrane of the same composition as that employed in Examples 38-46 with $SnO_2$, $TiO_2$, $VO_2$, $MoO_2$ $WO_2$, $RuO_2$, $NbO_2$, $CrO_2$, $\alpha$-$ReO_2$, $OsO_2$, $RhO_2$, $IrO_2$ and $PtO_2$ as the sputter sources under the same conditions as set forth above in Examples 38-46. The air electrodes were manufactured by the same method as used for Examples 38-46.

COMPARATIVE EXAMPLE 35

After suspending activated carbon powder in an aqueous solution of palladium chloride and reducing it with formalin, what is known as "palladium-coated activated carbon powder" was produced. This powder was then waterproofed with a 10-15% polytetrafluoroethylene dispersion; subsequently, after PTFE powder was mixed with it as a binding agent, it was rolled into a sheet. This sheet was pressed on to a nickel net to make the main body of an electrode having a thickness of 0.6 mm. Next, a PTFE dispersion was mixed with synthetic graphite powder and then mixed with PTFE powder as a binding agent and rolled. An air electrode having a thickness 1.6 mm was manufactured by pressure-bonding the sheet thus obtained on to the above-mentioned main body.

COMPARATIVE EXAMPLE 36

After pressure-bonding a membrane of polysiloxane (which is selectively permeable to oxygen gas) of 50 um thickness to a Raney nickel plate of 80% porosity and with a mean pore diameter of 0.5 um, and thickness of 200 um, the Raney nickel plate with the above thin layer was then dipped in 0.2% solution of palladium chloride. Palladium was deposited to a thickness of 0.5 um over the entire surface of the air electrode by cathode polarization, including those parts of the surface containing the pores in the Raney nickel plate.

COMPARATIVE EXAMPLE 37

An air electrode was manufactured similar to that of Comparative Example 35 except that a water vapor absorbent layer of calcium chloride was affixed to the air side of the electrode.

COMPARATIVE EXAMPLE 38

A composite membrane was prepared by forming, on one surface of a porous polycarbonate membrane with uniformly distributed micropores of a mean diameter of 0.08 um and a pore volume of 3.0% (manufactured by the Nuclepore Corporation; trade name, Nuclepore; thickness, 5 um), a thin layer of 0.005 um thickness containing $SiO_2$ in a carbon matrix as in Examples 38–46. After pressure bonding the porous polycarbonate side of the composite membrane to one surface of a Raney nickel plate (thickness 200 um) of 80% porosity and with a mean pore diameter of 5 um, the Raney nickel plate with the above thin layer was then dipped in 0.2% solution of palladium chloride. Palladium was deposited to a thickness of 0.5 um over the entire surface of the air electrode by cathode polarization, including those parts of the surface containing the pores in the Raney nickel plate.

COMPARATIVE EXAMPLE 39

An air electrode similar to that of Comparative Example 38 was manufactured except that the thickness of the thin layer containing $SiO_2$ in a carbon matrix was 2.0 um.

Using the above-mentioned 61 air electrodes, air-zinc cells were assembled with the opposite anode made of amalgamated zinc gel (3% by weight of mercury in the amalgam), electrolyte of potassium hydroxide and a separator of non-woven fabric of polyamide. After the 61 cells were left for 16 hours in air at a temperature of 25° C., they were discharged at various values of current for 5 minutes. The current density, at a terminal voltage of 1.0 V or less, was measured after the 5 minutes. The cells were also stored at a temperature of 45° C. at 90% relative humidity and observed for leakage of the electrolyte.

Discharge tests similar to the above were performed after the cells were removed from storage, and the ratio (%) of the current value at that time to the initial current value was calculated. This calculated value constitutes the "maintenance proportion of discharge properties" which indicates the degree of deterioration of the air electrode of each cell. The higher the value for an electrode, the less it had deteriorated.

With respect to the thin membrane affixed to each electrode, the oxygen gas permeation rate was measured by the equilibrium pressure method in which a gas chromatograph is used for detection of the gas. While the speed of permeation of water vapor was measured in accordance with the JISZ0208 measuring standard (cup method) and a comparison made between the two. The results are listed in Tables 4 and 5 below.

Potassium hydroxide was used as the electrolyte when the air electrodes of the Examples described above were evaluated. Similar results can be obtained, however, if other electrolytes are used, for example, ammonium chloride or sodium hydroxide or a mixed electrolyte of ruthenium hydroxide, lithium hydroxide, cesium hydroxide, etc. The air electrode of this invention has been found to be equally suitable for air-iron cells.

As described above, the air electrode of this invention is a significant improvement over the prior art in that while it is thin in size, it prevents the penetration of water vapor into the main body of the electrode as well as being capable of heavy-load discharge over a long period of time and shows a marked improvement in storage properties and resistance to electrolyte leakage.

TABLE 4

| Example | Main Body of Electrode Type | Thickness (um) | Thin Layer Type | Thickness (um) | Porous Membrane Present/Absent (Pore Diam.) | Current Density (mA/cm$^2$) | Maintenance of Proportion of Discharge Properties (%) | Gas Permeation Ratio of Thin Layer (JO$_2$/JH$_2$O) |
|---|---|---|---|---|---|---|---|---|
| 29 | Raney n.p. | 200 | SnO$_2$ | 0.4 | absent | 60 | 94 | 10.6 |
| 30 | | | ZnO | " | " | 58 | 93 | 9.0 |
| 31 | | | Al$_2$O$_3$ | " | " | 59 | 92 | 9.5 |
| 32 | | | MgO | " | " | 57 | 94 | 8.3 |
| 33 | | | CaO | " | " | 57 | 94 | 9.0 |
| 34 | | | SrO | " | " | 56 | 93 | 8.4 |
| 35 | | | BaO | " | " | 56 | 93 | 8.3 |
| 36 | | | TiO$_2$ | " | " | 59 | 92 | 9.2 |
| 37 | | | SiO$_2$ | " | " | 58 | 93 | 9.5 |
| 38 | Raney n.p. | 200 | SnO$_2$ | " | present (0.08 um) | 60 | 96 | 10.6 |
| 39 | | | ZnO | " | present (0.08 um) | 58 | 95 | 9.0 |
| 40 | | | Al$_2$O$_3$ | " | present (0.08 um) | 59 | 94 | 9.5 |
| 41 | | | MgO | " | present (0.08 um) | 57 | 96 | 8.3 |
| 42 | | | CaO | " | present (0.08 um) | 57 | 96 | 9.0 |
| 43 | | | SrO | " | present (0.08 um) | 56 | 95 | 8.4 |
| 44 | | | BaO | " | present (0.08 um) | 56 | 95 | 8.3 |
| 45 | | | TiO$_2$ | " | present (0.08 um) | 59 | 94 | 9.2 |
| 46 | | | SiO$_2$ | " | present (0.08 um) | 58 | 95 | 9.5 |
| 47 | Raney n.p. | 200 | SnO$_2$ | " | absent | 60 | 94 | 10.6 |
| 48 | | | ZnO | " | " | 58 | 93 | 9.0 |
| 49 | | | Cu$_2$O | " | " | 59 | 87 | 6.7 |
| 50 | | | MnO | " | " | 58 | 87 | 6.6 |
| 51 | | | NiO | " | " | 57 | 90 | 6.9 |
| 52 | | | Co$_3$O$_4$ | " | " | 57 | 89 | 6.9 |
| 53 | Raney n.p. | 200 | SnO$_2$ | " | present (0.08 um) | 60 | 96 | 10.6 |
| 54 | | | ZnO | " | present (0.08 um) | 58 | 95 | 9.0 |
| 55 | | | Cu$_2$O | " | present (0.08 um) | 59 | 89 | 6.7 |

TABLE 4-continued

| Example | Main Body of Electrode Type | Thickness (um) | Thin Layer Type | Thickness (um) | Porous Membrane Present/Absent (Pore Diam.) | Current Density (mA/cm$^2$) | Maintenance of Proportion of Discharge Properties (%) | Gas Permeation Ratio of Thin Layer (JO$_2$/JH$_2$O) |
|---|---|---|---|---|---|---|---|---|
| 56 | | | MnO | " | present (0.08 um) | 58 | 89 | 6.6 |
| 57 | | | NiO | " | present (0.08 um) | 57 | 92 | 6.9 |
| 58 | | | Co$_3$O$_4$ | " | present (0.08 um) | 57 | 91 | 6.9 |
| 59 | | | SnO$_2$ | " | absent | 60 | 94 | 10.6 |
| 60 | | | TiO$_2$ | " | " | 59 | 92 | 9.2 |
| 61 | | | VO$_2$ | " | " | 58 | 86 | 4.5 |
| 62 | | | MoO$_2$ | " | " | 58 | 85 | 4.4 |
| 63 | | | WO$_2$ | " | " | 59 | 85 | 4.4 |
| 64 | | | RuO$_2$ | " | " | 57 | 83 | 4.3 |
| 65 | | | NbO$_2$ | " | " | 59 | 86 | 4.5 |
| 66 | | | CrO$_2$ | " | " | 57 | 85 | 4.4 |
| 67 | | | α-ReO$_2$ | " | " | 58 | 85 | 4.4 |
| 68 | | | OsO$_2$ | " | " | 57 | 85 | 4.4 |
| 69 | | | RhO$_2$ | " | " | 56 | 85 | 4.4 |
| 70 | | | IrO$_2$ | " | " | 57 | 86 | 4.5 |
| 71 | | | PtO$_2$ | " | " | 58 | 86 | 4.5 |
| 72 | Raney n.p. | 200 | SnO$_2$ | 0.4 | present (0.08 um) | 60 | 96 | 10.6 |
| 73 | | | TiO$_2$ | " | present (0.08 um) | 59 | 96 | 9.2 |
| 74 | | | VO$_2$ | " | present (0.08 um) | 58 | 88 | 4.5 |
| 75 | | | MoO$_2$ | " | present (0.08 um) | 58 | 87 | 4.4 |
| 76 | | | WO$_2$ | " | Present (0.08 um) | 59 | 87 | 4.4 |
| 77 | | | RuO$_2$ | " | present (0.08 um) | 57 | 85 | 4.3 |
| 78 | | | NbO$_2$ | " | present (0.08 um) | 59 | 88 | 4.5 |
| 79 | | | CrO$_2$ | " | present (0.08 um) | 57 | 87 | 4.4 |
| 80 | | | α-ReO$_2$ | " | present (0.08 um) | 58 | 87 | 4.4 |
| 81 | | | OsO$_2$ | " | present (0.08 um) | 57 | 87 | 4.4 |
| 82 | | | RhO$_2$ | " | present (0.08 um) | 56 | 87 | 4.4 |
| 83 | | | IrO$_2$ | " | present (0.08 um) | 57 | 88 | 4.5 |
| 84 | | | PtO$_2$ | " | present (0.08 um) | 58 | 88 | 4.5 |

TABLE 5

| Comparative Example | Main Body of Electrode Electrode Type | Thickness (um) | Thin Layer Type | Thickness (um) | Porous Membrane Present/Absent (Pore Diam.) | Current Density (mA/cm$^2$) | Maintenance of Proportion of Discharge Properties (%) | Gas Permeation Ratio of Thin Layer (JO$_2$/JH$_2$O) |
|---|---|---|---|---|---|---|---|---|
| 35 | Palladium-coated activated carbon | 600 | — | — | — | 25 | 40 | — |
| 36 | Raney n.p. | 200 | Polysiloxane | 50 um | — | 50 | 60 | 0.032 |
| 37 | Palladium-coated activated carbon | 600 | — | — | — | 20 | 50 | — |
| 38 | Raney n.p. | 200 | SnO$_2$ | 0.005 | present (0.08 um) | 59 | 42 | — |
| 39 | Raney n.p. | 200 | SnO$_2$ | 2.0 | present (0.08 um) | 8 | 96 | 10.6 |

This invention has been described in detail in connection with preferred embodiments, but these embodiments are merely for example only and this invention is not restricted thereto. It will be easily understood by those skilled in the art that other variations and modifications can be easily made within the scope of this invention, as defined by the appended claims.

We claim:

1. A composite membrane, said membrane comprising:

a porous membrane having micropores; and a thin layer affixed to at least one surface of said porous membrane, said thin layer contains a metallic oxide in a carbon matrix; wherein said porous membrane and said thin layer cooperatively permit the passage of oxygen gas therethrough while substantially preventing the passage of water vapor therethrough, said metallic oxide being selected from among the group consisting of tin dioxide, zinc oxide, aluminum oxide, magnesium oxide, calcium oxide, strontium oxide, barium oxide, titanium dioxide, silicon dioxide, cuprous oxide, manganese monoxide, nickel oxide, tricobalt tetroxide, vanadium dioxide, molybdenum dioxide, tungsten dioxide, ruthenium dioxide, niobium dioxide, chromium dioxide, rhenium dioxide, osmium dioxide, rhodium dioxide, iridium dioxide and platinum dioxide.

2. A composite membrane according to claim 1 wherein said thin layer has a thickness in the range of 0.01 to 1.0 um.

3. A composite membrane according to claim 1 wherein the diameter of the micropores of said porous membrane is equal to or less than 1 um.

4. A composite membrane according to claim 1 which is prepared by a process comprising the step of depositing said thin layer on the surface of said porous membrane using a reactive sputtering treatment with a mixtured gas containing argon gas and a hydrocarbon compound.

5. A composite membrane according to claim 4 wherein said hydrocarbon compound is one selected from the group consisting of alkenes of the general formula $CnH_{2n+2}$, alkenes of the general formula $CnH_{2n}$, alkenes of the general formula $CnH_{2n-2}$ and fluorides in which a part or all of the hydrogen of the hydrocarbon compound has been substituted by fluorine.

6. A composite membrane according to claim 5 wherein the proportion of said hydrocarbon compound is less than 20 vol 70.

7. An air electrode for a cell comprising:
a main electrode body having the capability of electrochemical reduction of oxygen gas with a collector function; and
a thin layer integrally laminated on the gas side surface of said main electrode body directly or with a porous membrane therebetween, said thin layer containing metallic oxide in a carbon matrix, wherein said electrode body and said thin layer cooperatively permit the passage of oxygen gas therethrough while substantially preventing the passage of water vapor therethrough, said metallic oxide being selected from the group consisting of tin dioxide, zinc oxide, aluminum oxide, magnesium oxide, calcium oxide, strontium oxide, barium oxide, titanium dioxide, silicon dioxide, cuprous oxide, manganese monoxide, nickel oxide, tricobalt tetroxide, vanadium dioxide, molybdenum dioxide, tungsten dioxide, ruthenium dioxide, niobium dioxide, chromium dioxide, rhenium dioxide, osmium dioxide, rhodium dioxide, iridium dioxide and platinum dioxide.

8. An air electrode according to claim 7 wherein said thin layer has a thickness in the range of 0.01 to 1.0 um.

9. An air electrode according to claim 7 wherein said porous membrane has micropores with a diameter less than 1.0 um.

10. A method for manufacturing an oxygen gas permeable composite membrane comprising the step of:
forming a thin layer on a porous membrane having micropores by a reactive sputtering treatment in a mixed gas containing argon gas and a hydrocarbon compound, wherein said porous membrane and said thin layer cooperatively permit the passage of oxygen gas therethrough while substantially preventing the passage of water vapor therethrough, and wherein the sputter source is a metallic oxide selected from the group consisting of tin dioxide, zinc oxide, aluminum oxide, magnesium oxide, calcium oxide, strontium oxide, barium oxide, titanium dioxide, silicon dioxide, cuprous oxide, manganese monoxide, nickel oxide, tricobalt tetroxide, vanadium dioxide, molybdenum dioxide, tungsten dioxide, ruthenium dioxide, niobium dioxide, chromium dioxide, rhenium dioxide, osmium dioxide, rhodium dioxide, iridium dioxide and platinum dioxide.

* * * * *